(12) United States Patent
Zhou et al.

(10) Patent No.: US 9,472,950 B2
(45) Date of Patent: Oct. 18, 2016

(54) PROTECTION CIRCUIT OF POWER OVER ETHERNET PORT AND ETHERNET POWER-SOURCING EQUIPMENT

(71) Applicant: Huawei Technologies Co., Ltd., Shenzhen, Guangdong (CN)

(72) Inventors: Ming Zhou, Shenzhen (CN); Jing Li, Shenzhen (CN); Shuai Xu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 455 days.

(21) Appl. No.: 14/051,180

(22) Filed: Oct. 10, 2013

(65) Prior Publication Data
US 2014/0036400 A1 Feb. 6, 2014

Related U.S. Application Data

(63) Continuation of application No. PCT/CN2012/073789, filed on Apr. 11, 2012.

(30) Foreign Application Priority Data

Apr. 11, 2011 (CN) .......................... 2011 1 0089626

(51) Int. Cl.
*H02H 9/04* (2006.01)
*H04L 12/10* (2006.01)
*H04L 25/02* (2006.01)
*H04M 3/18* (2006.01)

(52) U.S. Cl.
CPC ............... *H02H 9/045* (2013.01); *H02H 9/04* (2013.01); *H02H 9/041* (2013.01); *H04L 12/10* (2013.01); *H04L 25/0266* (2013.01); *H04M 3/18* (2013.01)

(58) Field of Classification Search
CPC ........ H02H 9/045; H02H 9/04; H02H 9/041; H04L 12/10; H04L 25/0266; H04M 3/18
See application file for complete search history.

(56) References Cited

U.S. PATENT DOCUMENTS

| 5,388,022 A | * | 2/1995 | Ahuja | ...................... | H02H 3/06 361/111 |
| 7,050,285 B2 | * | 5/2006 | Sato | ........................ | H01C 7/123 361/118 |

(Continued)

FOREIGN PATENT DOCUMENTS

| CN | 2777845 Y | 5/2006 |
| CN | 2882132 Y | 3/2007 |

(Continued)

OTHER PUBLICATIONS

"IEEE Std 802.3—Information technology—Telecommunications and information exchange between systems—Local and metropolitan area networks—Specific requirements—Part 3: Carrier sense multiple access with collision detection (CSMA/CD) access method and physical layer specifications," 1998 Edition, IEEE, New York, New York (1998).

(Continued)

*Primary Examiner* — Zeev V Kitov
(74) *Attorney, Agent, or Firm* — Leydig, Voit & Mayer, Ltd.

(57) ABSTRACT

The present invention discloses a protection circuit of Power Over Ethernet (POE) port and an Ethernet power-sourcing equipment. The port protection circuit includes: a first common mode suppression component, a second common mode suppression component, and a rectifier bridge. A first input end and a second input end of the rectifier bridge are connected to a first direct current output end and a second direct current output end of a PoE control chip, respectively. A first output end or a second output end of the rectifier bridge is connected to an uncharged signal line of a PoE port. An end of the first common mode suppression component is connected to the first output end of the rectifier bridge, and another end thereof is grounded. An end of the second common mode suppression component is connected to the second output end of the rectifier bridge, and another end thereof is grounded.

19 Claims, 13 Drawing Sheets

(56) References Cited

U.S. PATENT DOCUMENTS

2004/0246644 A1   12/2004   Sato et al.
2007/0041387 A1   2/2007    Ghoshal et al.
2007/0171690 A1*  7/2007    Apfel .................. H02M 7/23
                                                    363/127

FOREIGN PATENT DOCUMENTS

| CN | 200950537 Y | 9/2007 |
|----|-------------|--------|
| CN | 101060412 A | 10/2007 |
| CN | 101227087 A | 7/2008 |
| CN | 101232384 A | 7/2008 |
| CN | 100470992 C | 3/2009 |
| CN | 101594236 A | 12/2009 |
| CN | 102185698 A | 9/2011 |
| EP | 0886361 A2  | 12/1998 |
| EP | 1928121 A2  | 6/2008 |
| EP | 2239925 A1  | 10/2010 |

OTHER PUBLICATIONS

International Search Report in corresponding PCT Patent Application No. PCT/CN2012/073789 (Jul. 12, 2012).

* cited by examiner

PROTECTION CIRCUIT OF POWER OVER ETHERNET PORT AND ETHERNET POWER-SOURCING EQUIPMENT

CROSS-REFERENCE TO RELATED APPLICATIONS

This application is a continuation of International Patent Application No. PCT/CN2012/073789, filed on Apr. 11, 2012, which claims priority to Chinese Patent Application No. 201110089626.0, filed on Apr. 11, 2011, both of which are hereby incorporated by reference in their entireties.

FIELD

The present invention relates to the field of electronic technologies, and in particular, to a protection circuit of Power over Ethernet port and an Ethernet power-sourcing equipment.

BACKGROUND

Power over Ethernet (PoE) refers to a technology in which an Ethernet power-sourcing equipment (PSE) supplies power for a powered device (PD) through an Ethernet cable. The longest distance of reliable power supply of PoE is 100 meters. When the PSE and the PD are a bit far away from each other and a wiring is placed outdoors, the PSE and the PD are very vulnerable to lightening strikes. Therefore, it is necessary to provide protective measures.

The PSE includes a PoE control chip, which outputs a 48 volts direct current voltage through a set of direct current output ends. The set of direct current output ends includes a first direct current output end and a second direct current output end. The voltage between the first direct current output end and the second direct current output end is 48 volts. In the prior art, a port protection circuit is usually added to the PSE. A schematic diagram of a port protection circuit in the prior art is shown in FIG. 1.

An existing port protection circuit mainly includes a differential mode suppression component D1 and a common mode suppression component. An end of the differential mode suppression component D1 is connected to the first direct current output end of the PoE control chip, and the other end of the differential mode suppression component D1 is connected to the second direct current output end of the PoE control chip. The common mode suppression component includes a first voltage dependent resistor RV1 and a second voltage dependent resistor RV2. A first end of the first voltage dependent resistor RV1 is connected to the first direct current output end of the PoE control chip, and the other end of the first voltage dependent resistor RV1 is grounded. A first end of the second voltage dependent resistor RV2 is connected to the second direct current output end of the PoE control chip, and the other end of the second voltage dependent resistor RV2 is grounded.

The existing port protection circuit uses two voltage dependent resistors to protect against a common mode surge. When a common mode surge occurs, a differential mode residual voltage may be caused since it is impossible for the two voltage dependent resistors to act consistently. When the differential mode residual voltage is large, the PoE control chip is damaged.

SUMMARY

According to an embodiment of the present invention, a port protection circuit is provided. The port protection circuit includes a first common mode suppression component, a second common mode suppression component, and a rectifier bridge. A first input end of the first rectifier bridge is connected to a first direct current output end of a first set of direct current output ends of a Power over Ethernet (PoE) control chip. A second input end of the first rectifier bridge is connected to a second direct current output end of the first set of direct current output ends of the PoE control chip. A first output end or a second output end of the first rectifier bridge is connected to an uncharged signal line of a first PoE port. A first end of the first common mode suppression component is connected to the first output end of the first rectifier bridge, and a second end of the first common mode suppression component is grounded. A first end of the second common mode suppression component is connected to the second output end of the first rectifier bridge, and a second end of the second common mode suppression component is grounded.

According to another embodiment of the present invention, an Ethernet power-sourcing equipment is provided. The Ethernet power-sourcing equipment includes a Power over Ethernet (PoE) control chip, a PoE port, and a port protection circuit connected with the PoE control chip and the PoE port. The port protection circuit comprises a first common mode suppression component, a second common mode suppression component, and a first rectifier bridge. A first input end of the first rectifier bridge is connected to a first direct current output end of a first set of direct current output ends of a Power over Ethernet (PoE) control chip. A second input end of the first rectifier bridge is connected to a second direct current output end of the first set of direct current output ends of the PoE control chip. A first output end or a second output end of the first rectifier bridge is connected to an uncharged signal line of a first PoE port. A first end of the first common mode suppression component is connected to the first output end of the first rectifier bridge, and a second end of the first common mode suppression component is grounded. A first end of the second common mode suppression component is connected to the second output end of the first rectifier bridge, and a second end of the second common mode suppression component is grounded.

In the port protection circuit provided by the embodiments of the present invention, the first common mode suppression component and the second common mode suppression component are connected to the two output ends of the rectifier bridge, respectively. Based on characteristics of the rectifier bridge, the protection circuit is balanced so that the problem that a common mode overvoltage is converted into a differential mode overvoltage due to inconsistent actions of protection components in the prior art may be solved.

BRIEF DESCRIPTION OF THE DRAWINGS

To describe the technical solutions in the embodiments of the present invention or in the prior art more clearly, the following briefly introduces the accompanying drawings required for describing the embodiments or the prior art. Apparently, the accompanying drawings in the following description show merely some embodiments of the present invention, and a person of ordinary skill in the art may still derive other drawings from these accompanying drawings.

DETAILED DESCRIPTION OF THE EMBODIMENTS

To make persons skilled in the art better understand the solutions of the present invention, the following clearly describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention shall fall within the protection scope of the present invention.

Embodiments of the present invention provide a port protection circuit and an Ethernet power-sourcing equipment. To make the technical solutions of the embodiments of the present invention more comprehensible, the embodiments of the present invention are described in detail with reference to the accompanying drawings in the following.

Figure 1:
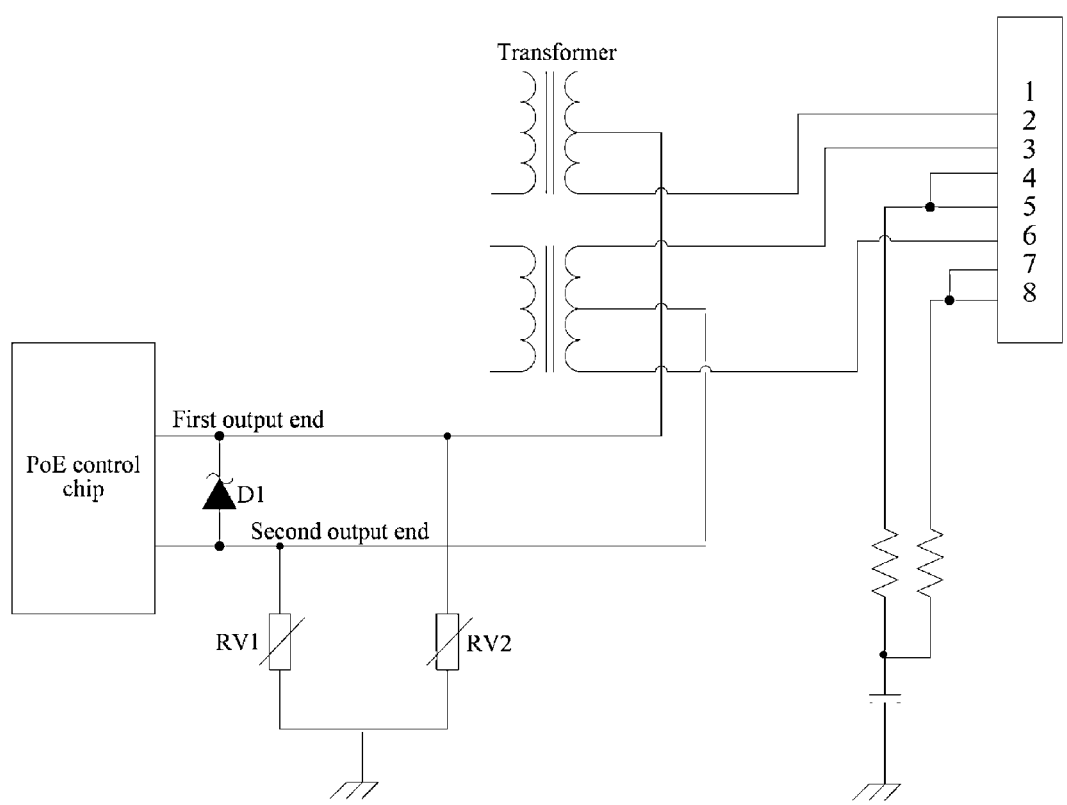
FIG. 1 is a schematic circuit diagram of a port protection circuit in the prior art.
Figure 2:
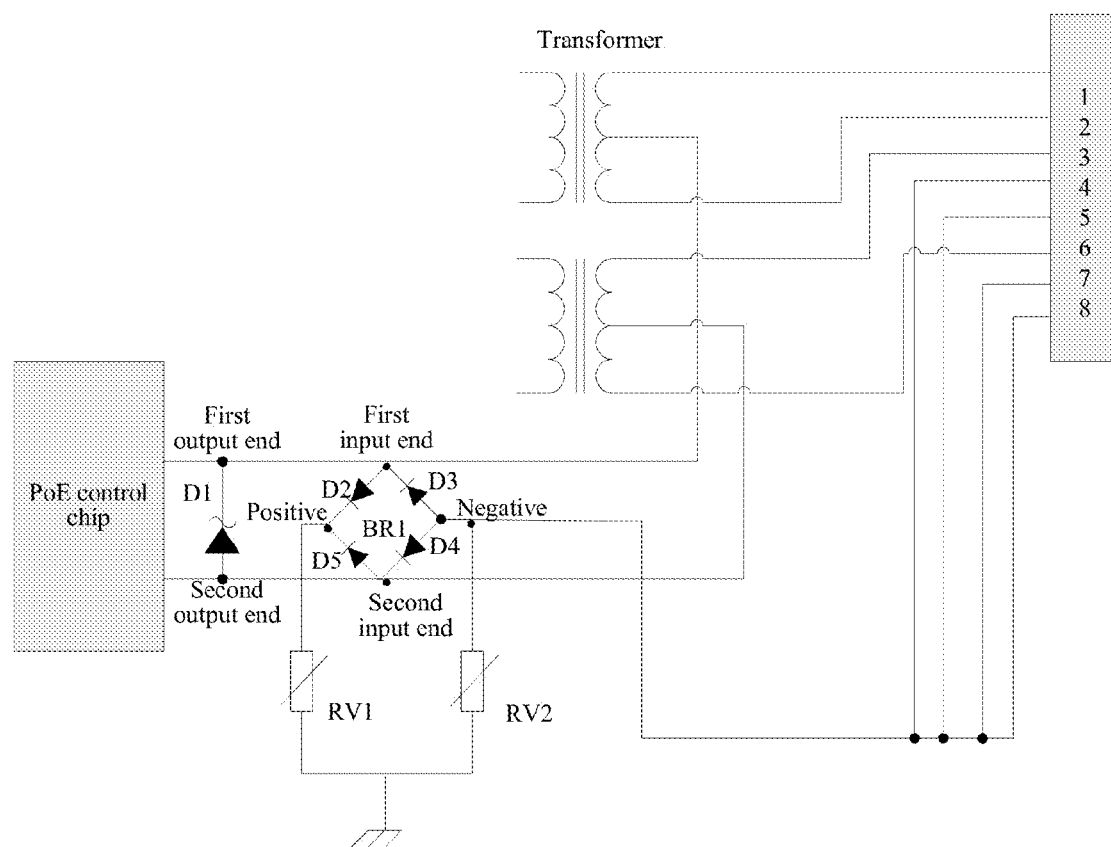
FIG. 2 is a schematic circuit diagram of a port protection circuit according to Embodiment 1 of the present invention.

FIG. 2 is a schematic circuit diagram of a port protection circuit according to Embodiment 1 of the present invention.

As shown in FIG. 2, the port protection circuit includes a differential mode suppression component D1, a first common mode suppression component RV1, a second common mode suppression component RV2, and a rectifier bridge BR1. In this embodiment, the number of ports is 1, and correspondingly the number of rectifier bridges is 1. As shown in FIG. 2, the rectifier bridge BR1 includes, for example, four diodes (i.e., D2, D3, D4, and D5). An anode of a first diode D2 is connected to a cathode of a second diode D3, an anode of the second diode D3 is connected to an anode of a third diode D4, a cathode of the third diode D4 is connected to an anode of a fourth diode D5, and a cathode of the fourth diode D5 is connected to a cathode of the first diode D2. The port protection circuit may be used in a FE (Fast Ethernet) (10/100 M) port.

The rectifier bridge may also be formed by a common cathode rectifier diode and a common anode rectifier diode.

As shown in FIG. 2, a first input end and a second input end of the rectifier bridge BR1 are connected to a first direct current output end and a second direct current output end of a PoE control chip, respectively. A first output end (a positive end) or a second output end (a negative end) of the rectifier bridge is connected to an idle signal line of the port. The idle signal line is an uncharged signal line, for example, signal lines 4, 5, 7, and 8 in FIG. 2.

An end of the first common mode suppression component RV1 is connected to the first output end of the rectifier bridge BR1, and the other end of the first common mode suppression component RV1 is grounded. An end of the second common mode suppression component RV2 is connected to the second output end of the rectifier bridge BR1, and the other end of the second common mode suppression component RV2 is grounded.

An end of the differential mode suppression component D1 is connected to the first direct current output end of the PoE control chip, and the other end of the differential mode suppression component D1 is connected to the second direct current output end of the PoE control chip. The differential mode suppression component D1 may be used to protect against a differential mode surge between the two direct current output ends of the PoE control chip.

Figure 3:
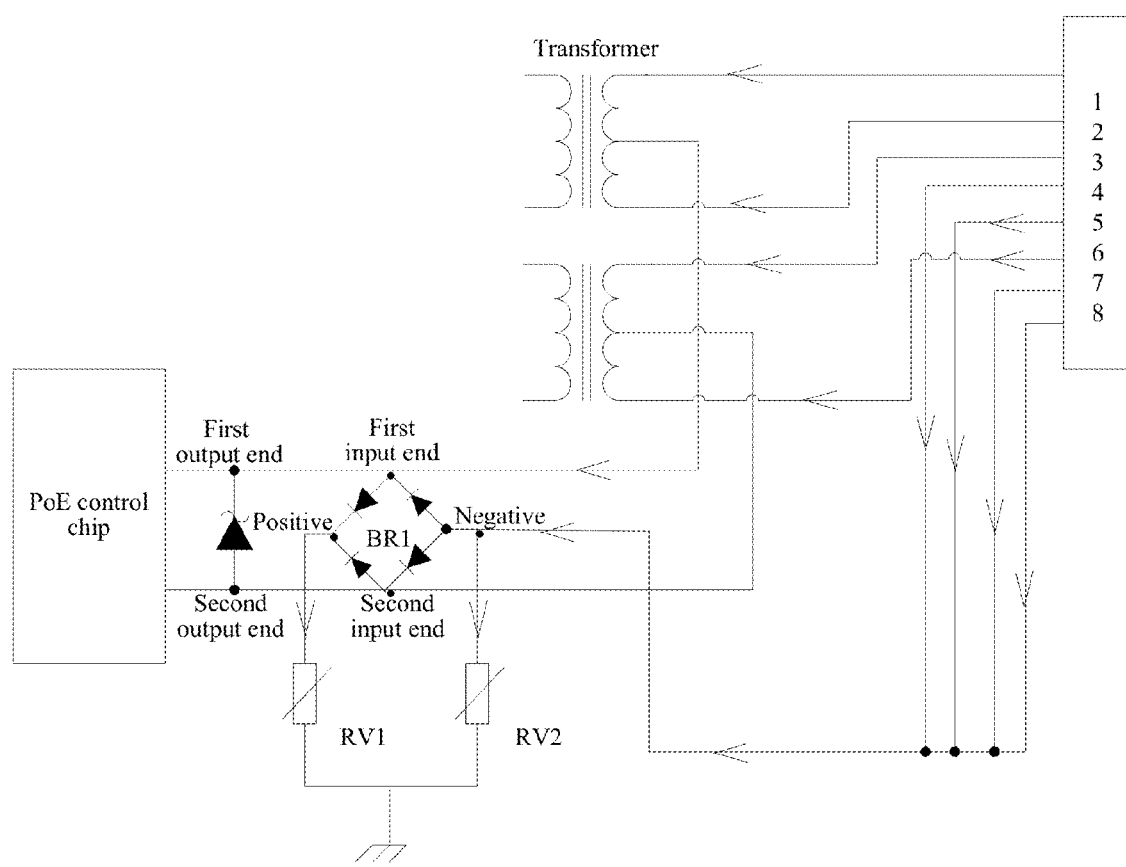
FIG. 3 is a schematic diagram illustrating discharging of a positive common mode surge in the port protection circuit shown in FIG. 2.

When a positive common mode surge voltage exists at the port, a discharge path of the port protection circuit is shown in FIG. 3. The positive common mode surge is discharged into the ground through the first common mode suppression component RV1 and the second common mode suppression component RV2.

Figure 4:
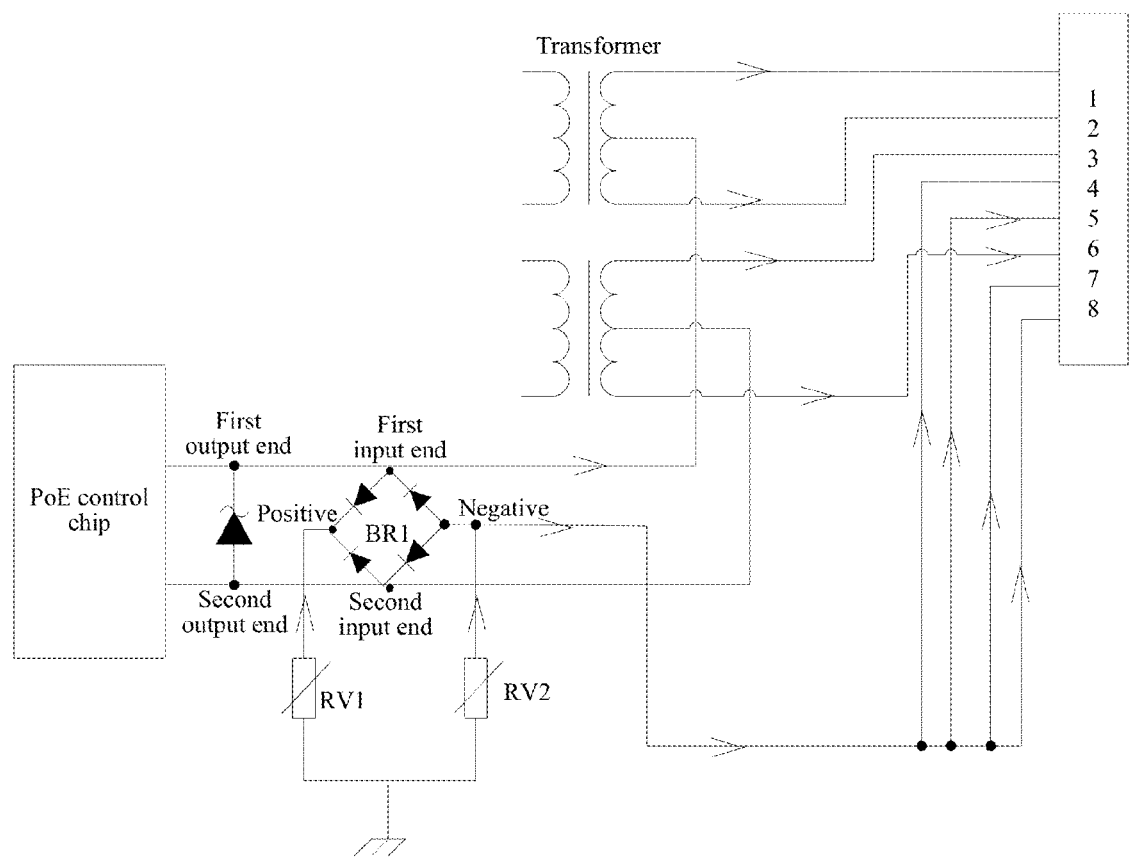
FIG. 4 is a schematic diagram illustrating discharging of a negative common mode surge in the port protection circuit shown in FIG. 2.

When a negative common mode surge voltage exists at the port, a discharge path of the port protection circuit is shown in FIG. 4. The negative common mode surge is discharged into the ground through the first common mode suppression component RV1 and the second common mode suppression component RV2.

In the port protection circuit shown in FIG. 2, the first common mode suppression component RV1 and the second common mode suppression component RV2 are connected to the two output ends of the rectifier bridge BR1, respectively. Based on characteristics of the rectifier bridge, the port protection circuit is balanced, so that the problem that a common mode overvoltage is converted into a differential mode overvoltage due to inconsistent actions of protection components in the prior art can be solved and safety is good.

Figure 5:
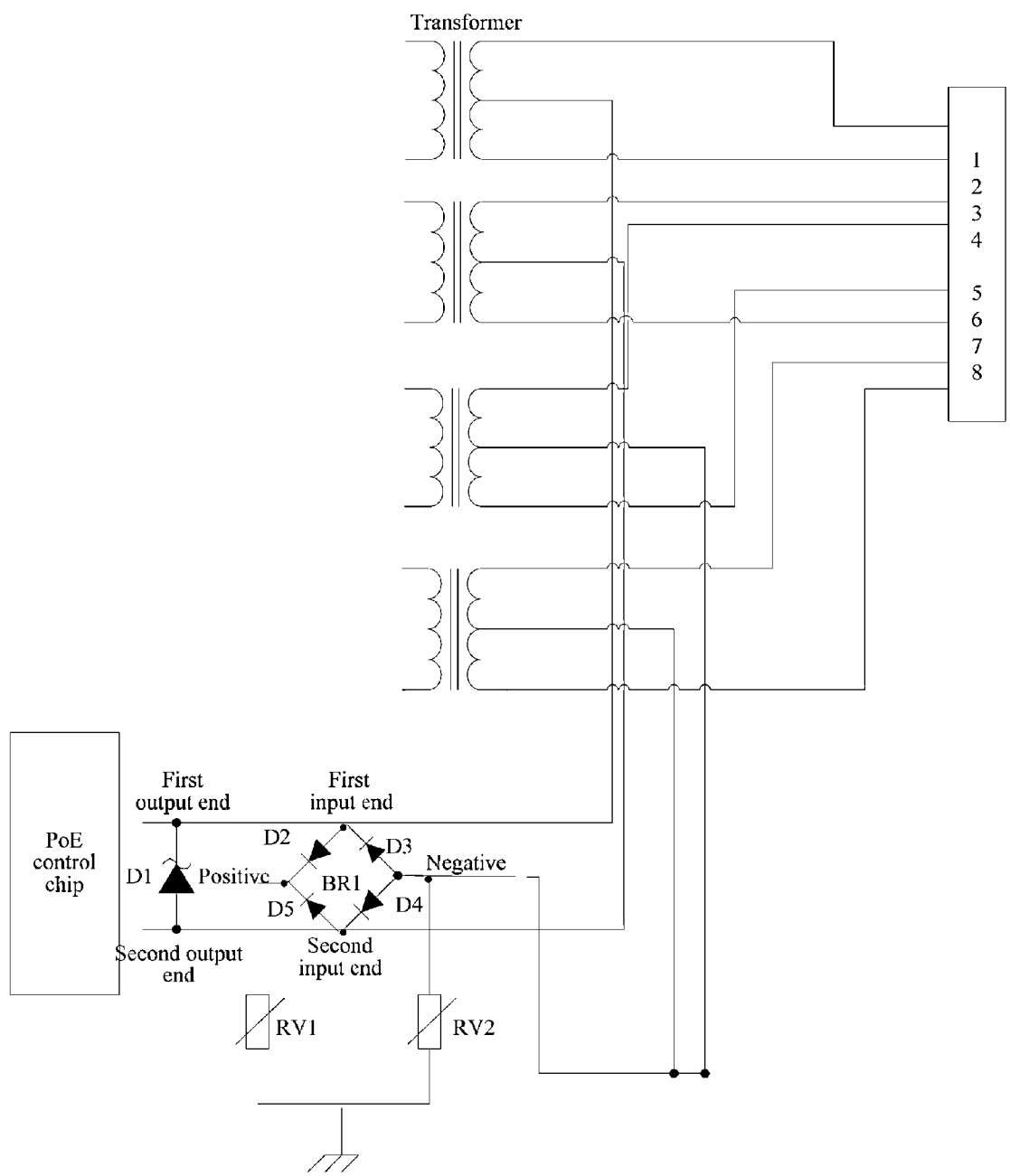
FIG. 5 is a schematic circuit diagram of a port protection circuit according to Embodiment 2 of the present invention.

FIG. 5 is a schematic circuit diagram of a port protection circuit according to Embodiment 2 of the present invention.

The difference between the port protection circuit shown in FIG. 5 and the port protection circuit shown in FIG. 2 lies in that, in Embodiment 2 of the present invention, the first output end or the second output end of the rectifier bridge BR1 may be connected, through a central tap of a transformer of the corresponding port, to a signal line of the port. As shown in FIG. 5, the signal lines 4 and 5 are connected to the second output end of the rectifier bridge BR1 through a central tap of a transformer, and the signal lines 7 and 8 are connected to the second output end of the rectifier bridge BR1 through a central tap of a resistance transformer. The port protection circuit in Embodiment 2 may be used in a GE (1000 M) port.

In the port protection circuit provided by the embodiment of the present invention, the first common mode suppression component RV1 and the second common mode suppression component RV2 may be other components, such as voltage dependent resistors, semiconductor arresters, gas discharge tubes, or transient suppression diodes. The differential mode suppression component D1 may be a transient suppression diode or a voltage dependent resistor or another component.

Figure 6:
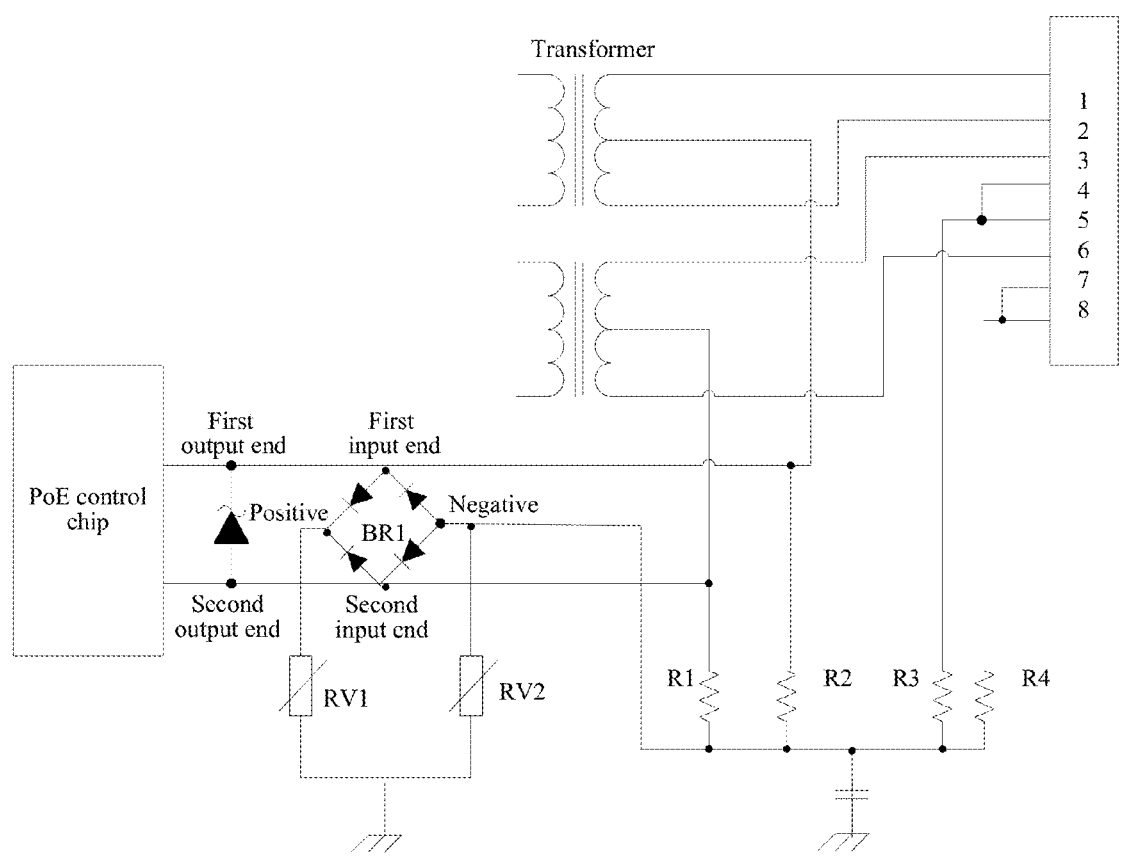
FIG. 6 is a schematic circuit diagram of a port protection circuit according to Embodiment 3 of the present invention.

FIG. 6 is a schematic circuit diagram of a port protection circuit according to Embodiment 3 of the present invention.

The difference between the port protection circuit according to Embodiment 3 of the present invention and the port protection circuit according to Embodiment 1 lies in that, in Embodiment 3 of the present invention, the first output end or the second output end of the rectifier bridge BR1 may be connected through a central tap of a transformer of the corresponding port to a signal line of the port, or connected through a resistor to a signal line of the port, or connected through a central tap of a transformer and a resistor to a signal line of the port. For example, signal lines 1 and 2 are connected to the second output end of the rectifier bridge BR1 through a resistor R2 and a central tap of a transformer, signal lines 3 and 6 are connected to the second output end of the rectifier bridge BR1 through a resistor R1 and a central tap of a transformer, signal lines 4 and 5 are connected to the second output end of the rectifier bridge BR1 through a resistor R3, and signal lines 7 and 8 are connected to the second output end of the rectifier bridge BR1 through a resistor R4.

In the port protection circuit according to Embodiment 3 of the present invention, the first common mode suppression component RV1 and the second common mode suppression component RV2 may be voltage dependent resistors, semiconductor arresters, gas discharge tubes, or transient suppression diodes etc.

In Embodiment 3 of the present invention, resistors (i.e., R1, R2, R3 and R4) are connected to the first output end or the second output end of the rectifier bridge, for impedance matching at the port, thereby providing the protection circuit with better electromagnetic compatibility.

Figure 7:
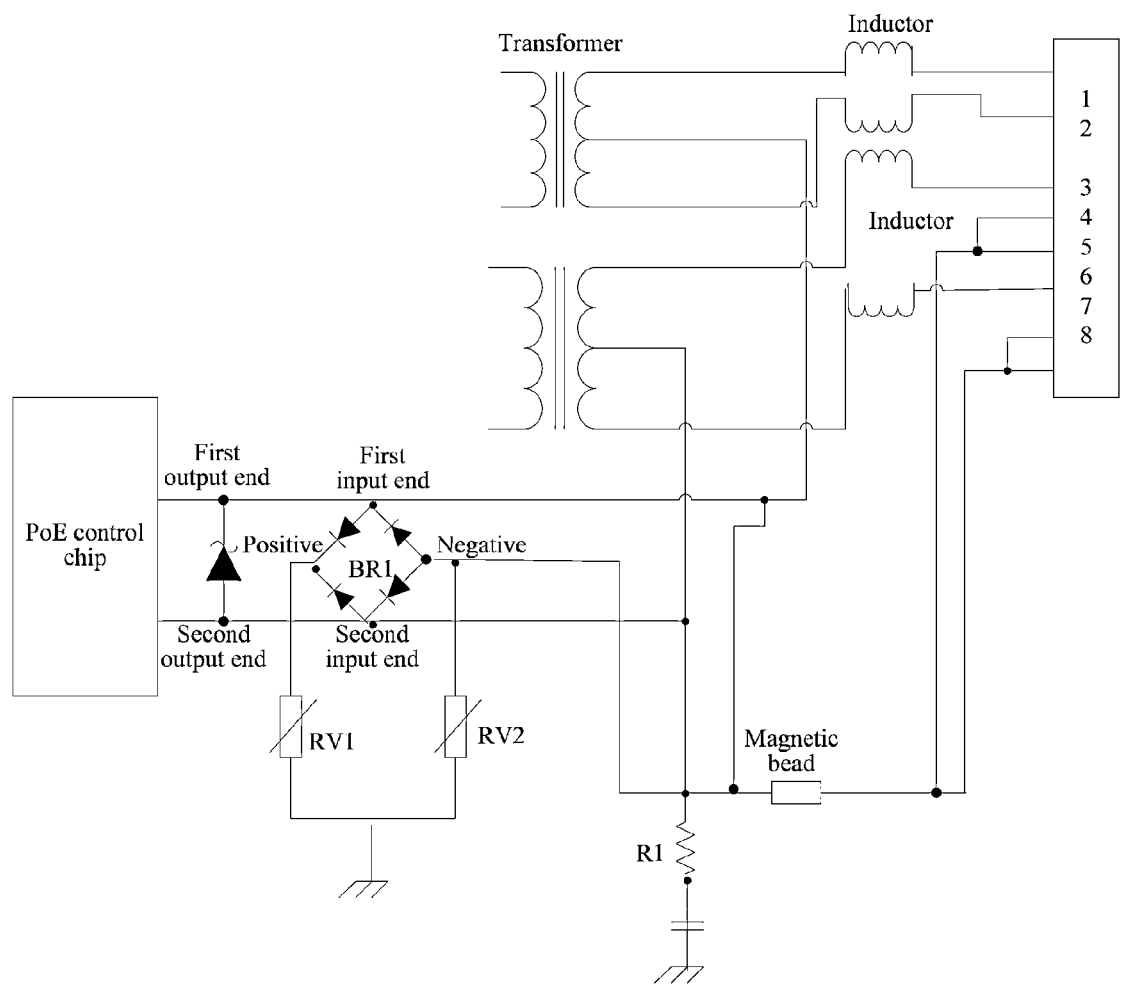
FIG. 7 is a schematic circuit diagram of a port protection circuit according to Embodiment 4 of the present invention.

FIG. 7 is a schematic circuit diagram of a port protection circuit according to Embodiment 4 of the present invention.

The difference between the port protection circuit according to Embodiment 4 of the present invention and the port protection circuit according to Embodiment 1 lies in that the first output end or the second output end of the rectifier bridge BR1 is connected to a signal line of the port through an inductor and a magnetic bead. For example, signal lines 1 and 2 are connected to the second output end of the rectifier bridge BR1 through an inductor, signal lines 3 and 6 are connected to the second output end of the rectifier bridge BR1 through an inductor, signal lines 4 and 5 are connected to the second output end of the rectifier bridge BR1 through a magnetic bead, and signal lines 7 and 8 are connected to the second output end of the rectifier bridge BR1 through the magnetic bead. In Embodiment 4 of the present invention, by connecting the magnetic bead to the first output end or the second output end of the rectifier bridge BR1, noise and interference on signal lines may be suppressed. In Embodiment 4 of the present invention, by connecting inductors in series to the signal lines, noise and interference on the signal lines may be cleared.

Figure 8:
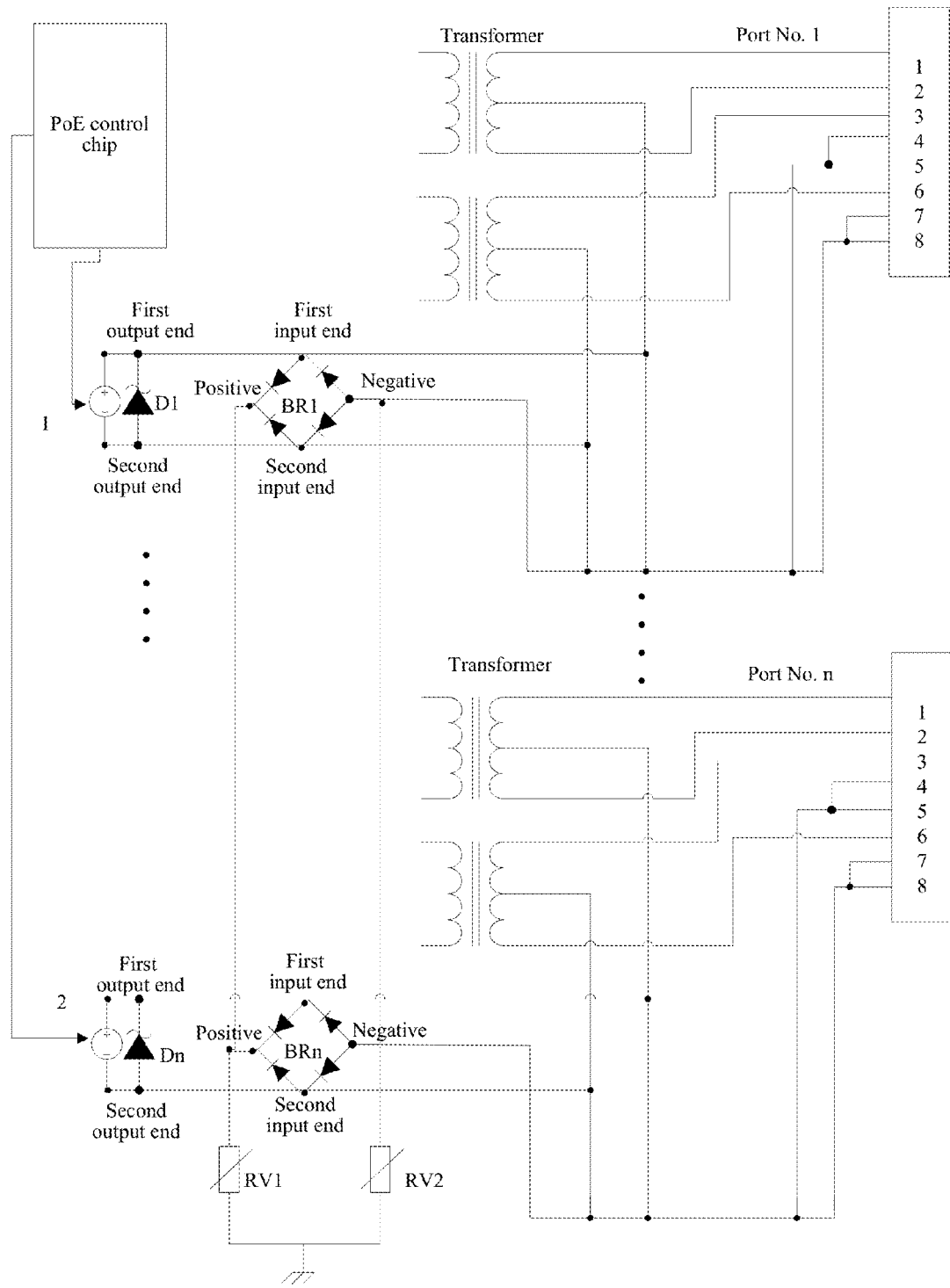
FIG. 8 is a schematic circuit diagram of a port protection circuit according to Embodiment 5 of the present invention.

FIG. 8 is a schematic circuit diagram of a port protection circuit according to 5 of the present invention. The port protection circuit includes n differential mode protection components D1, D2, . . . , Dn, n rectifier bridges BR1, BR2, . . . , BRn, a first common mode suppression component RV1, and a second common mode suppression component RV2.

n is equal to the number of ports in a power-sourcing equipment, and n is greater than 1. Each port includes a rectifier bridge. As shown in FIG. 8, the rectifier bridge may be formed by using four diodes (D2, D3, D4, and D5).

In Embodiment 5 of the present invention, a first input end and a second input end of each rectifier bridge are connected to a first direct current output end and a second direct current output end of a PoE control chip, respectively. A first output end or a second output end of each rectifier bridge is connected to a signal line of a corresponding port.

The PoE control chip may include a plurality of sets of direct current output ends. For example, a first input end and a second input end of the rectifier bridge BR1 are connected to a first direct current output end and a second direct current output end in a first set of direct current output ends, respectively. A second output end of the rectifier bridge BR1 is connected to signal lines 1 to 8 of a corresponding port No. 1.

In Embodiment 5 of the present invention, an end of the first common mode suppression component RV1 is connected to a first output end of each rectifier bridge, and another end of RV1 is grounded. An end of the second common mode suppression component RV2 is connected to a second output end of each rectifier bridge, and another end of RV2 is grounded. In the embodiment of the present invention, a first output end of each rectifier bridge is grounded through a common mode suppression component and a second output end of each rectifier bridge is grounded through a common mode suppression component.

In the port protection circuit according to Embodiment 5 of the present invention, the first common mode suppression component RV1 is connected to the first output end of each rectifier bridge and the second common mode suppression component RV2 is connected to the second output end of each rectifier bridge, so that the port protection circuit is balanced, the problem that a common mode overvoltage is converted into a differential mode overvoltage due to inconsistent actions of protection components in the prior art may be solved, and safety is good.

In addition, the port protection circuit according to Embodiment 5 of the present invention may be applied to multiple ports. Compared with the prior art in which a single common mode suppression component needs to be provided for each port, in the port protection circuit provided by the embodiment of the present invention, one set of common mode suppression components is shared, which may reduce the volume of the port protection circuit, thereby saving the cost of the protection circuit.

Figure 9:
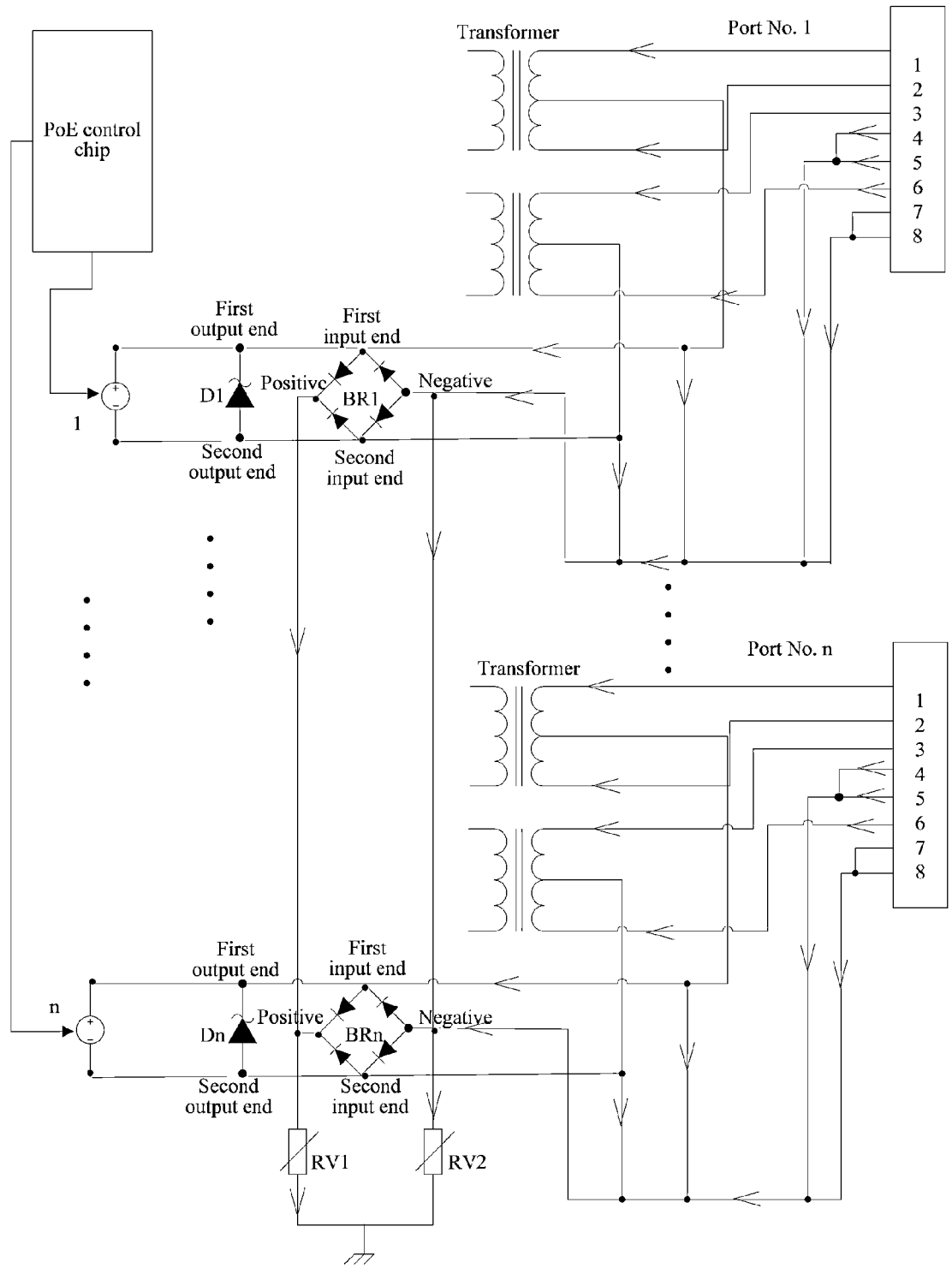
FIG. 9 is a schematic diagram illustrating discharging of a positive common mode surge in the port protection circuit shown in FIG. 8.

When a positive common mode surge voltage exists at the port, a discharge path of the port protection circuit according to Embodiment 5 of the present invention is shown in FIG. 9. That is, a positive common mode surge is discharged into the ground through the first common mode suppression component RV1 and the second common mode suppression component RV2.

Figure 10:
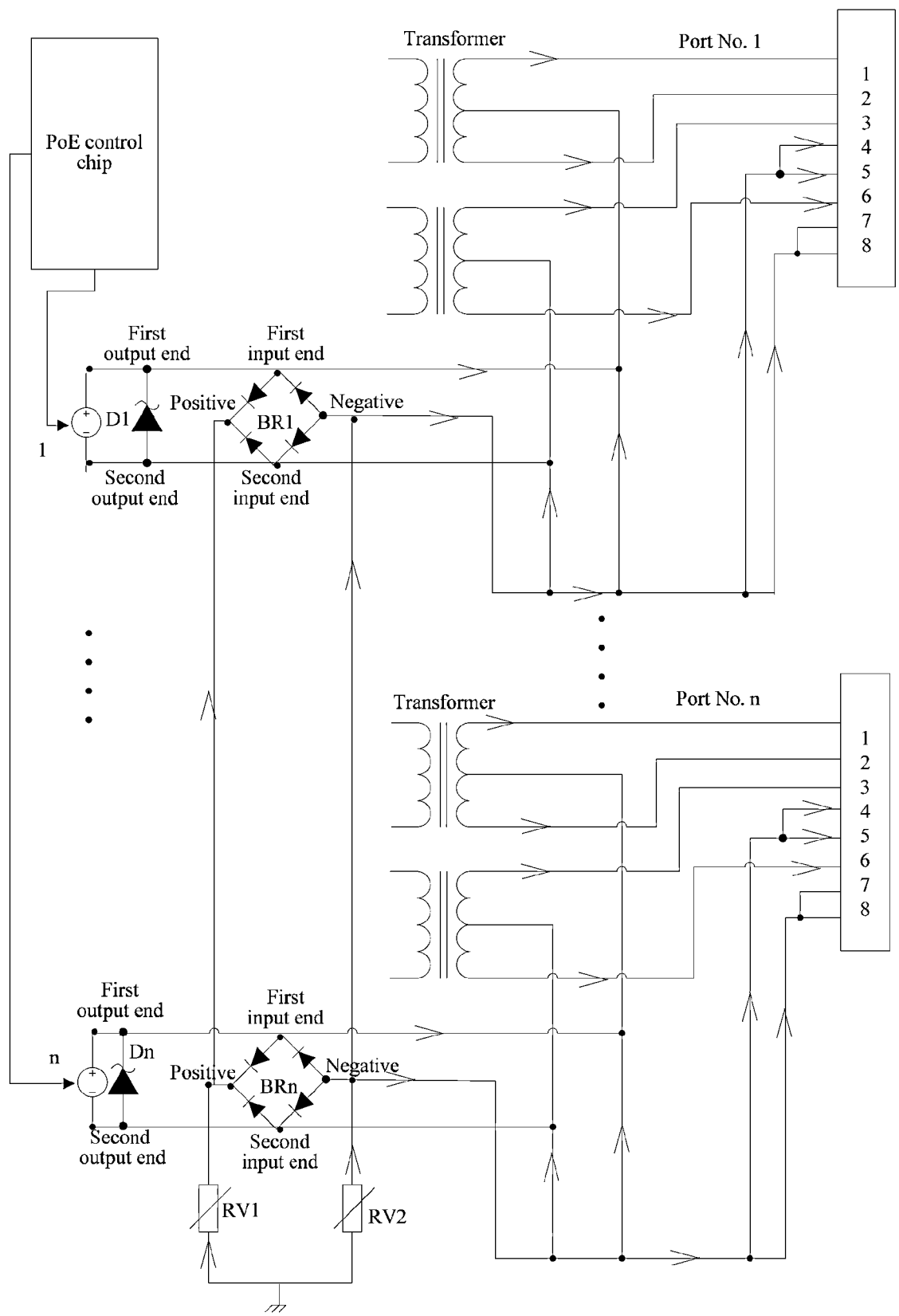
FIG. 10 is a schematic diagram illustrating discharging of a negative common mode surge in the port protection circuit shown in FIG. 8.

When a negative common mode surge voltage exists at the port, a discharge path of the port protection circuit provided by the embodiment of the present invention is shown in FIG. 10. That is, a negative common mode surge is discharged into the ground through the first common mode suppression component RV1 and the second common mode suppression component RV2.

Figure 11:
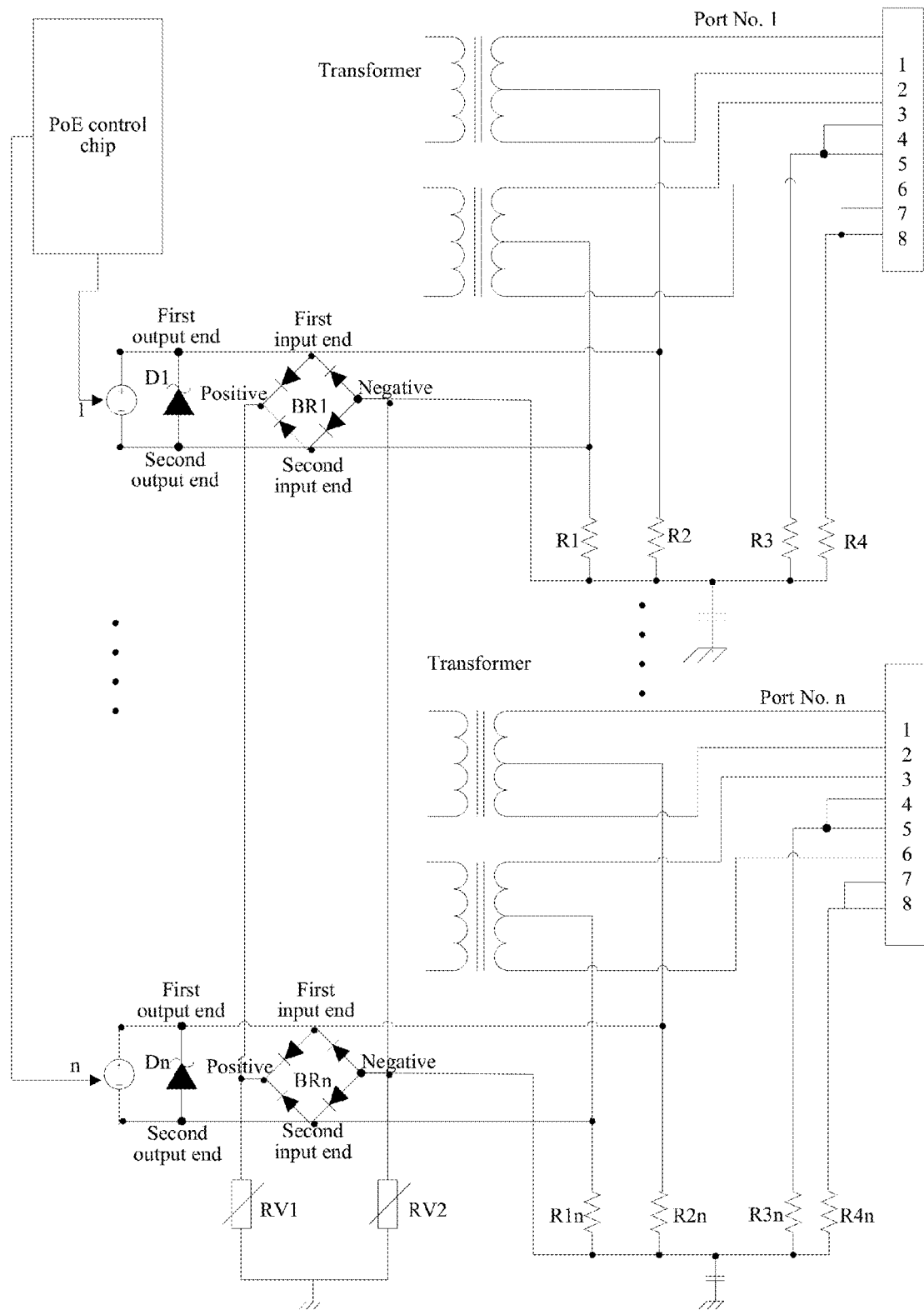
FIG. 11 is a schematic circuit diagram of a port protection circuit according to Embodiment 6 of the present invention.

FIG. 11 is a schematic circuit diagram of a port protection circuit according to Embodiment 6 of the present invention.

The difference between the port protection circuit according to Embodiment 6 of the present invention and the port protection circuit according to Embodiment 5 lies in that a first output end or a second output end of each rectifier bridge is connected to a signal line of a port through a resistor. For example, signal lines 1 and 2 of the port No. 1 are connected to the second output end of the rectifier bridge BR1 through a resistor R2, signal lines 3 and 6 are connected to the second output end of the rectifier bridge BR1 through a resistor R1, signal lines 4 and 5 are connected to the second output end of the rectifier bridge BR1 through a resistor R3, and signal lines 7 and 8 are connected to the second output end of the rectifier bridge BR1 through a resistor R4.

The port protection circuits according to the embodiments of the present invention are introduced in detail above. An embodiment of the present invention further provides an Ethernet power-sourcing equipment including the above described port protection circuit.

Figure 12:
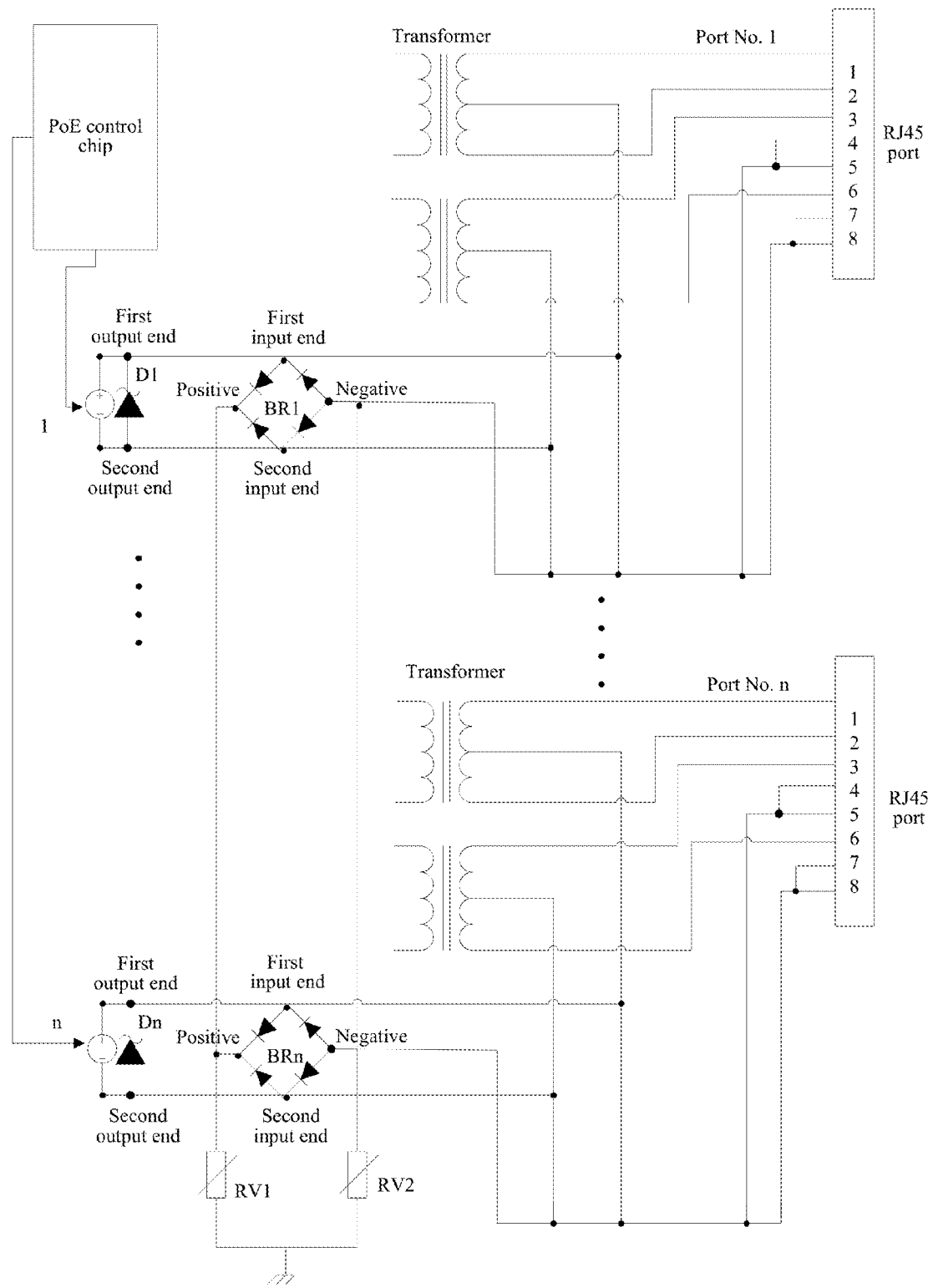
FIG. 12 is a schematic circuit diagram of an Ethernet power-sourcing equipment according to Embodiment 7 of the present invention.

FIG. 12 is a schematic circuit diagram of an Ethernet power-sourcing equipment according to Embodiment 7 of the present invention.

In this embodiment, the Ethernet power-sourcing equipment includes a port and a port protection circuit. The number of ports is m and m is a positive integer. The Ethernet power-sourcing equipment further includes a PoE control chip. A port in an Ethernet is, for example, an Registered Jack 45 (RJ45) port.

For details about the structure of the port protection circuit, reference may be made to the relevant description of the above Embodiments 1, 2, 3, 4, 5, and 6, and the details are not repeated herein again.

When the Ethernet power-sourcing equipment is supplying power, signal lines 1, 2, 3, and 6 of a port No. 1 (e.g., an RJ45 port) are charged, and the signal lines 1 and 2 are connected to a second output end of a rectifier bridge through a central tap of a transformer and the signal lines 3 and 6 are connected to the second output end of the rectifier bridge through a central tap of a transformer. Idle signal lines 4, 5, 7, and 8 are uncharged and are directly connected to the second output end of the rectifier bridge.

In the Ethernet power-sourcing equipment, a positive common mode surge or a negative common mode surge at the port may be discharged through common mode suppression components RV1 and RV2. For a specific schematic diagram illustrating the discharging, reference is made to relevant description of the above Embodiments 1 and 3.

In the Ethernet power-sourcing equipment, the first common mode suppression component RV1 and the second common mode suppression component RV2 in the port protection circuit may be other components, such as voltage dependent resistors, semiconductor arresters, gas discharge tubes, or transient suppression diodes. A differential mode suppression component D1 may be a transient suppression diode or a voltage dependent resistor.

In the Ethernet power-sourcing equipment, the first common mode suppression component RV1 of the port protection circuit is connected to the first output end of each rectifier bridge and the second common mode suppression component RV2 of the port protection circuit is connected to the second output end of each rectifier bridge, so that the protection circuit is balanced, the problem that a common mode overvoltage is converted into a differential mode overvoltage due to inconsistent actions of protection components in the prior art can be effectively solved, and safety is good.

In addition, the port protection circuit in the Ethernet power-sourcing equipment may be applied to a plurality of ports. Compared with the prior art in which a single common mode suppression component needs to be provided for each port, in the port protection circuit provided by the embodiment of the present invention, one set of common mode suppression components is shared, which may reduce the volume of the port protection circuit and may further save the space occupied by the port protection circuit. In this way, not only a cost may be saved, but also the demand for protecting high-density ports of the Ethernet power-sourcing equipment against a large surge current may be implemented.

Figure 13:
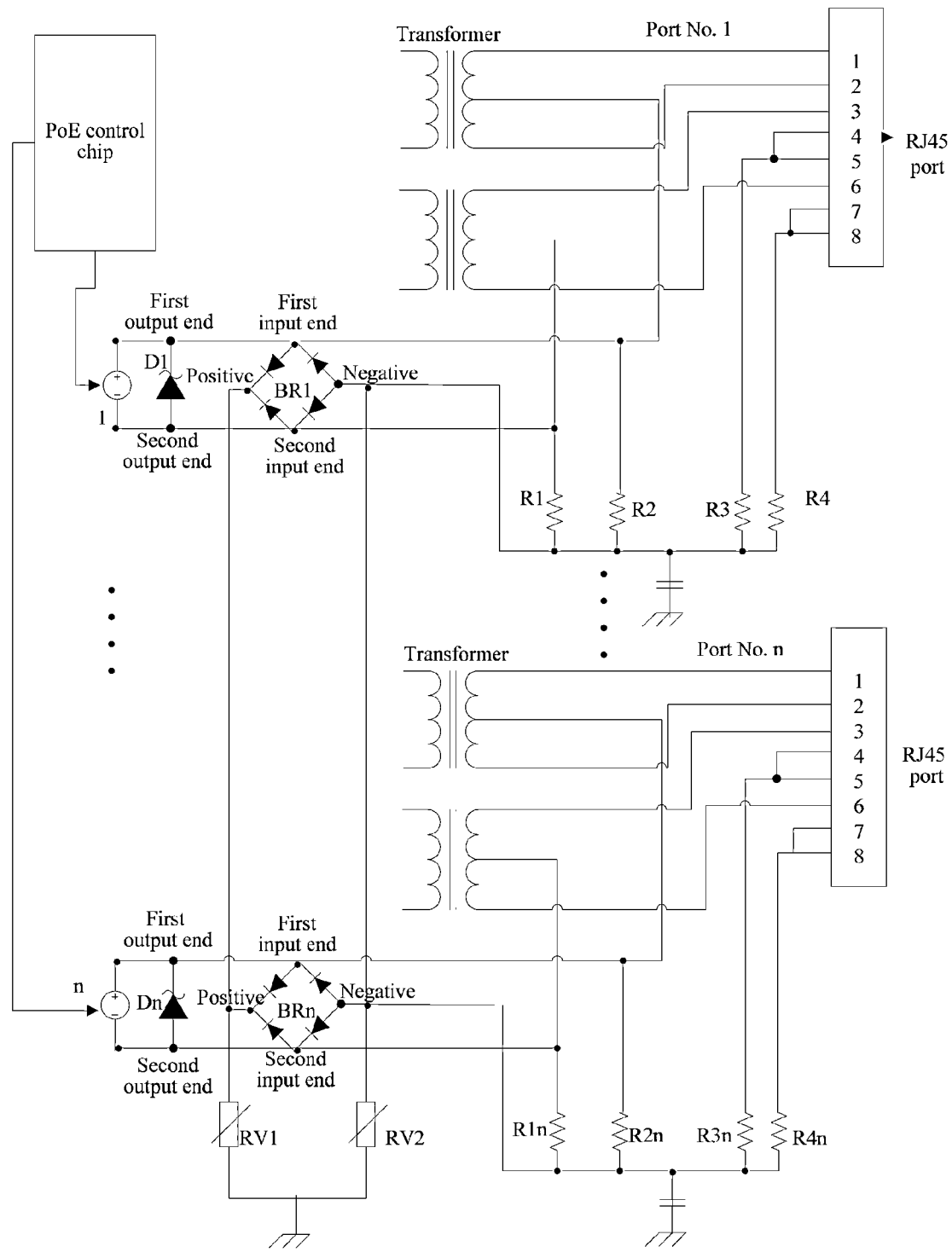
FIG. 13 is a schematic circuit diagram of an Ethernet power-sourcing equipment according to Embodiment 8 of the present invention.

FIG. 13 is a schematic circuit diagram of an Ethernet power-sourcing equipment according to Embodiment 8 of the present invention.

The difference between the Ethernet power-sourcing equipment according to Embodiment 8 of the present invention and the Ethernet power-sourcing equipment according to Embodiment 7 lies in that the first output end or the second output end of the rectifier bridge is connected to a signal line of a port through a resistor in the port protection circuit. For example, the signal lines 1 and 2 of the port No. 1 (e.g., a RJ45 port) are connected to the second output end of the rectifier bridge BR1 through a resistor R2, the signal lines 3 and 6 are connected to the second output end of the rectifier bridge BR1 through a resistor R1, the signal lines 4 and 5 are connected to the second output end of the rectifier bridge BR1 through a resistor R3, and the signal lines 7 and 8 are connected to the second output end of the rectifier bridge BR1 through a resistor R4.

The port protection circuit and the Ethernet power-sourcing equipment according to the embodiments of the present invention are introduced in detail above. Persons of ordinary skill in the art can make variations to the present invention in terms of the specific implementation and the application scope according to the ideas of the embodiments of the present invention. The content of the specification should not be understood as a limit to the present invention.

What is claimed is:

1. A port protection circuit, comprising:
a first common mode suppression component, a second common mode suppression component, a first rectifier bridge, and a second rectifier bridge, wherein
a first input end of the first rectifier bridge is connected to a first direct current output end of a first set of direct current output ends of a Power over Ethernet (PoE) control chip;
a second input end of the first rectifier bridge is connected to a second direct current output end of the first set of direct current output ends of the PoE control chip;
a first output end of the first rectifier bridge is connected to an uncharged signal line of a first PoE port;
a first input end of the second rectifier bridge is connected to a first direct current output end of a second set of direct current output ends of the PoE control chip;
a second input end of the second rectifier bridge is connected to a second direct current output end of the second set of direct current output ends of the PoE control chip;
a first output end of the second rectifier bridge is connected to an uncharged signal line of a second PoE port;
a first end of the first common mode suppression component is connected to the first output end of the first rectifier bridge and the first output end of the second rectifier bridge, and a second end of the first common mode suppression component is grounded; and
a first end of the second common mode suppression component is connected to the second output end of the first rectifier bridge and the second output end of the second rectifier bridge, and a second end of the second common mode suppression component is grounded.

2. The port protection circuit according to claim 1, wherein the first rectifier bridge comprises a common anode rectifier diode and a common cathode rectifier diode.

3. The port protection circuit according to claim 1, wherein the first rectifier bridge comprises a first diode, a second diode, a third diode, and a fourth diode,
   wherein an anode of the first diode is connected to a cathode of the second diode, an anode of the second diode is connected to an anode of the third diode, a cathode of the third diode is connected to an anode of the fourth diode, and a cathode of the fourth diode is connected to a cathode of the first diode.

4. The port protection circuit according to claim 3, wherein the junction of the first diode and the second diode is the first input end of the first rectifier bridge, the junction of the second diode and the third diode is the first output end of the first rectifier bridge, the junction of the third diode and the fourth diode is the second input end of the first rectifier bridge, and the junction of the fourth diode and the first diode is the second output end of the first rectifier bridge.

5. The port protection circuit according to claim 1, wherein the first output end or the second output end of the first rectifier bridge is connected to the uncharged signal line of the first PoE port through a central tap of a transformer of the first PoE port.

6. The port protection circuit according to claim 1, wherein the first output end or the second output end of the first rectifier bridge is connected to the uncharged signal line of the first PoE port through a resistor, an inductor, or a magnetic bead.

7. The port protection circuit according to claim 1, wherein the first output end or the second output end of the first rectifier bridge is connected to the uncharged signal line of the first PoE port through a resistor and a central tap of a transformer of the first PoE port.

8. The port protection circuit according to claim 1, wherein the first common mode suppression component and the second common mode suppression component are voltage dependent resistors, semiconductor arresters, gas discharge tubes, or transient suppression diodes.

9. The port protection circuit according to claim 1, further comprising a differential mode suppression component, wherein a first end of the differential mode suppression component is connected to the first direct current output end of the first set of direct current output ends of the PoE control chip, and a second end of the differential mode suppression component is connected to the second direct current output end of the first set of direct current output ends of the PoE control chip.

10. The port protection circuit according to claim 1, further comprising a first differential mode suppression component and a second differential mode suppression component, wherein:
   a first end of the first differential mode suppression component is connected to the first direct current output end of the first set of direct current output ends of the PoE control chip;
   a second end of the first differential mode suppression component is connected to the second direct current output end of the first set of direct current output ends of the PoE control chip;
   a first end of the second differential mode suppression component is connected to the first direct current output end of the second set of direct current output ends of the PoE control chip; and
   a second end of the second differential mode suppression component is connected to the second direct current output end of the second set of direct current output ends of the PoE control chip.

11. An Ethernet power-sourcing equipment, comprising:
   a Power over Ethernet (PoE) control chip, a first PoE port, a second PoE port, and a port protection circuit connected with the PoE control chip, the first PoE port and the second PoE port,
   wherein the port protection circuit comprises a first common mode suppression component, a second common mode suppression component, and a first rectifier bridge and a second rectifier bridge, wherein
   a first input end of the first rectifier bridge is connected to a first direct current output end of a first set of direct current output ends of the PoE control chip;
   a second input end of the first rectifier bridge is connected to a second direct current output end of the first set of direct current output ends of the PoE control chip;
   a first output end of the first rectifier bridge is connected to an uncharged signal line of the first PoE port;
   a first input end of the second rectifier bridge is connected to a first direct current output end of a second set of direct current output ends of the PoE control chip;
   a second input end of the second rectifier bridge is connected to a second direct current output end of the second set of direct current output ends of the PoE control chip;
   a first output end of the second rectifier bridge is connected to an uncharged signal line of the second PoE port;
   a first end of the first common mode suppression component is connected to the first output end of the first rectifier bridge and the first output end of the second rectifier bridge, and a second end of the first common mode suppression component is grounded; and
   a first end of the second common mode suppression component is connected to the second output end of the first rectifier bridge and the second output end of the second rectifier bridge, and a second end of the second common mode suppression component is grounded.

12. The Ethernet power-sourcing equipment according to claim 11, wherein the first rectifier bridge comprises a common anode rectifier diode and a common cathode rectifier diode.

13. The Ethernet power-sourcing equipment according to claim 11, wherein the first rectifier bridge comprises a first diode, a second diode, a third diode, and a fourth diode, wherein an anode of the first diode is connected to a cathode of the second diode, an anode of the second diode is connected to an anode of the third diode, a cathode of the third diode is connected to an anode of the fourth diode, and a cathode of the fourth diode is connected to a cathode of the first diode.

14. The Ethernet power-sourcing equipment according to claim 13, the junction of the first diode and the second diode is the first input end of the first rectifier bridge, the junction of the second diode and the third diode is the first output end of the first rectifier bridge, the junction of the third diode and the fourth diode is the second input end of the first rectifier bridge, and the junction of the fourth diode and the first diode is the second output end of the first rectifier bridge.

15. The Ethernet power-sourcing equipment according to claim 11, wherein the first output end or the second output end of the first rectifier bridge is connected to the uncharged signal line of the first PoE port through a central tap of a transformer of the first PoE port.

16. The Ethernet power-sourcing equipment according to claim 11, wherein the first output end or the second output end of the first rectifier bridge is connected to the uncharged signal line of the first PoE port through a resistor, an inductor, or a magnetic bead.

17. The Ethernet power-sourcing equipment according to claim 11, wherein the first output end or the second output end of the first rectifier bridge is connected to the uncharged signal line of the first PoE port through a resistor and a central tap of a transformer of the first PoE port.

18. The Ethernet power-sourcing equipment according to claim 11, wherein the first common mode suppression component and the second common mode suppression component are voltage dependent resistors, semiconductor arresters, gas discharge tubes, or transient suppression diodes.

19. The Ethernet power-sourcing equipment according to claim 11, wherein the port protection circuit further comprises a first differential mode suppression component and a second differential mode suppression component, wherein:

a first end of the first differential mode suppression component is connected to the first direct current output end of the first set of direct current output ends of the PoE control chip;

a second end of the differential mode suppression component is connected to the second direct current output end of the first set of direct current output ends of the PoE control chip;

a first end of the second differential mode suppression component is connected to the first direct current output end of the second set of direct current output ends of the PoE control chip;

a second end of the second differential mode suppression component is connected to the second direct current output end of the second set of direct current output ends of the PoE control chip.

* * * * *